US006494325B1

(12) United States Patent
Mizrahi

(10) Patent No.: US 6,494,325 B1
(45) Date of Patent: Dec. 17, 2002

(54) TOILET WATER-LINE FILTER

(76) Inventor: Israel Mizrahi, 6614 Noble Ave., Van Nuys, CA (US) 91405

( * ) Notice: Subject to any disclaimer, the term of this patent is extended or adjusted under 35 U.S.C. 154(b) by 0 days.

(21) Appl. No.: 09/692,863

(22) Filed: Oct. 23, 2000

(51) Int. Cl.[7] .............................................. B01D 35/02
(52) U.S. Cl. ...................... 210/447; 210/448; 210/450; 210/452; 210/460; 210/463; 210/495; 210/499; 4/256.1; 4/288; 4/290; 4/DIG. 14; 137/550; 285/334.4; 285/353
(58) Field of Search .............................. 210/323.2, 302, 210/390, 167, 94–95, 499, 429, 435, 459, 460, 464, 431–432, 445, 446, 448, 449, 451, 452, 463, 450, 495; 4/287, 288, 286, DIG. 13, DIG. 14, DIG. 19, 256.1, 290; 92/78; 285/353, 334.5; 137/550, 554, 547, 549

(56) References Cited

U.S. PATENT DOCUMENTS

| | | | | |
|---|---|---|---|---|
| 1,071,306 A | * | 8/1913 | Finigan | 210/305 |
| 1,477,885 A | * | 12/1923 | Lehmann | 210/311 |
| 1,511,726 A | * | 10/1924 | Heinze | 210/441 |
| 1,832,776 A | * | 11/1931 | Hudson | |
| 2,658,625 A | * | 11/1953 | Rafferty | |
| 3,458,050 A | * | 7/1969 | Cooper | 210/448 |
| 3,618,629 A | * | 11/1971 | Hayer | |
| 4,413,675 A | * | 11/1983 | Gano | |
| 4,596,269 A | * | 6/1986 | Stephens | |
| 5,105,480 A | * | 4/1992 | Howell et al. | |
| 5,332,192 A | * | 7/1994 | Whiteside | |
| 5,662,791 A | * | 9/1997 | Hurst et al. | 210/167 |
| 5,796,035 A | * | 8/1998 | Walker | |
| 5,887,848 A | * | 3/1999 | Wilson | |
| 6,075,206 A | * | 6/2000 | Walker | |

* cited by examiner

Primary Examiner—Matthew O. Savage
Assistant Examiner—Marianne Ocampo

(57) ABSTRACT

A toilet water-line filter (10) that is designed to protect a toilet's fill valve (62) from the intrusion of potentially damaging debris such as rocks, vegetation, etc. The filter (10) is comprised of a housing (12) and an internal filter (34) which consists of a mesh staining element (36). The filter (10) is attached between the toilet's fill valve (62) and a typical, flexible, water line (66). Debris that would normally pass into the fill valve (62) becomes trapped in the mesh staining element (36), from where the debris is easily removed.

19 Claims, 3 Drawing Sheets

TOILET WATER-LINE FILTER

TECHNICAL FIELD

The invention generally pertains to water filters and, more particularly, to a filter for a toilet fill valve.

BACKGROUND ART

Previously, as people became aware to what extent typical urban tap water was polluted, there arose the desire and/or need to provide a solution to the problems causes by the polluted water.

The most obvious concern was that many individuals or families who could not afford to buy, or simply did not want to buy "bottled water", such as Sparklettes or Arrowhead, were having to use the polluted water for drinking, cooking and bathing. Once the public concern had reached a significant level, many critics decided to study what pollutants were present in the water, and what effects resulted from the pollutants. In the water processing industry it was common knowledge that chemicals, such as chlorine, were added to the water in order to purify and cleanse the water of other potentially dangerous chemicals. The water was also filtered to remove particles that could, after time, clog the system. A balance was reached as to what chemicals were necessary to keep the water suitable for flowing, and to provide for health consumption and use by people.

Although this balance attempted to provide a realistic solution to both problems, many cities continued to receive complaints about the water. In order to remedy the complaints, the cities opted to provide better "tasting" water by adding more chemicals.

The result is, as many people have discovered, that water is able to clog through various places which it flow. The most typical places for clogs is where water is constantly used and replaced, such as sinks, bathtubs/showers and toilets. For most sinks and many bathtubs/showers there are filtering devices available that provide additional filtration and removal of many chemicals and particles, such as small rocks.

Unfortunately, there is no filtration device available for a toilet. Most modern toilets utilize a system of pipes and floats to remove used water and re-fill the toilet. As a result of non-filtered water entering the fill valve, a toilet can clog and subsequently overflow or stop working. Obviously, if there were some way to filter the water that enters a toilet, it would save people significant amounts of money in repairs/replacements and help stop overflows, which are not only messy but can be dangerous to people's health.

A search of the prior art did not disclose any patents that read directly on the claims of the instant invention however, the following U.S. patents were considered related:

| PATENT NO. | INVENTOR | ISSUED |
| --- | --- | --- |
| 5,887,848 | Wilson | March 30, 1999 |
| 5,332,192 | Whiteside | July 26, 1994 |

The Wilson patent discloses a diaphragm type of flush valve for use with toilet devices such as urinals and water closets. The invention includes a body with an inlet and an outlet with a valve set therebetween and a valve member movable to a closing position on the valve seat. The vale member includes a diaphragm which is peripherally attached to the body. A pressure chamber above the diaphragm holds the valve member on its valve seat and there is a filter and a bypass orifice connecting the inlet, and the pressure chamber. The filter includes a filter ring positioned beneath the diaphragm and adjacent the outer periphery thereof. A peripheral chamber is bounded by a seal ring, the filter ring and the body, with water reaching the peripheral chamber by passing through filter ring grooves.

The Whiteside patent discloses a diaphragm-type of flush valve for use with toilet devices such as urinals and water closets. The invention has a body with an inlet and an outlet and a valve seat therebetween. There is a valve member movable to a closing position on the valve seat to stop flow between the inlet and the outlet. The valve member includes a diaphragm peripherally attached to the body. A filter and bypass orifice connect the inlet and pressure chamber, with a bypass orifice being formed in a retaining disc and the filter being formed in part by a portion of the diaphragm.

DISCLOSURE OF THE INVENTION

In its most basic design, the toilet water line filter operates in combination with a toilet fill valve, which includes a threaded inlet that protrudes through a bore on the base of a toilet tank, and a flexible water line having an inlet connected to a water source and a threaded outlet.

The water-line filter is comprised of a housing having an inlet, an outlet and a bore therethrough, which is comprised of two diameters. The first diameter extends from the edge of the inlet to an outward-projecting ledge, from where the second diameter commences. The second diameter then extends to the edge of the outlet. In order to facilitate attachment, the inlet is externally threaded and the outlet is internally threaded.

A filter is comprised of a mesh straining element having an edge that is attached to a resilient washer. The filter is dimensioned to have the washer seat against the ledge. In order to attached the water-line filter to the toilet fill valve, the outlet of the housing is threaded into the threaded inlet of the toilet fill valve, and the threaded outlet of the flexible water line is threaded into the threaded inlet of the housing.

In view of the above disclosure, the primary object of the invention is to provide a toilet water-line filter that will limit the flow of debris into a toilet fill valve, thus protecting the fill valve from clogging and extend the duration of the fill valve's use.

Additionally, the toilet water-line filter can:
1) be manufactured from a variety of materials, such as metal or plastic,
2) protect other elements of a toilet that can be affected by un-filtered water,
3) be manufactured as an integral part of the flexible water line that is used with a toilet,
4) be discarded after an elapsed time, or can be re-used with a new filtering element and,
5) be cost effective from both a consumer's and manufacturer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for an toilet water-line filter. The filter is designed to protect a toilet's fill valve from the intrusion of potentially damaging debris, such as rocks, vegetation, etc.

Figure 2:
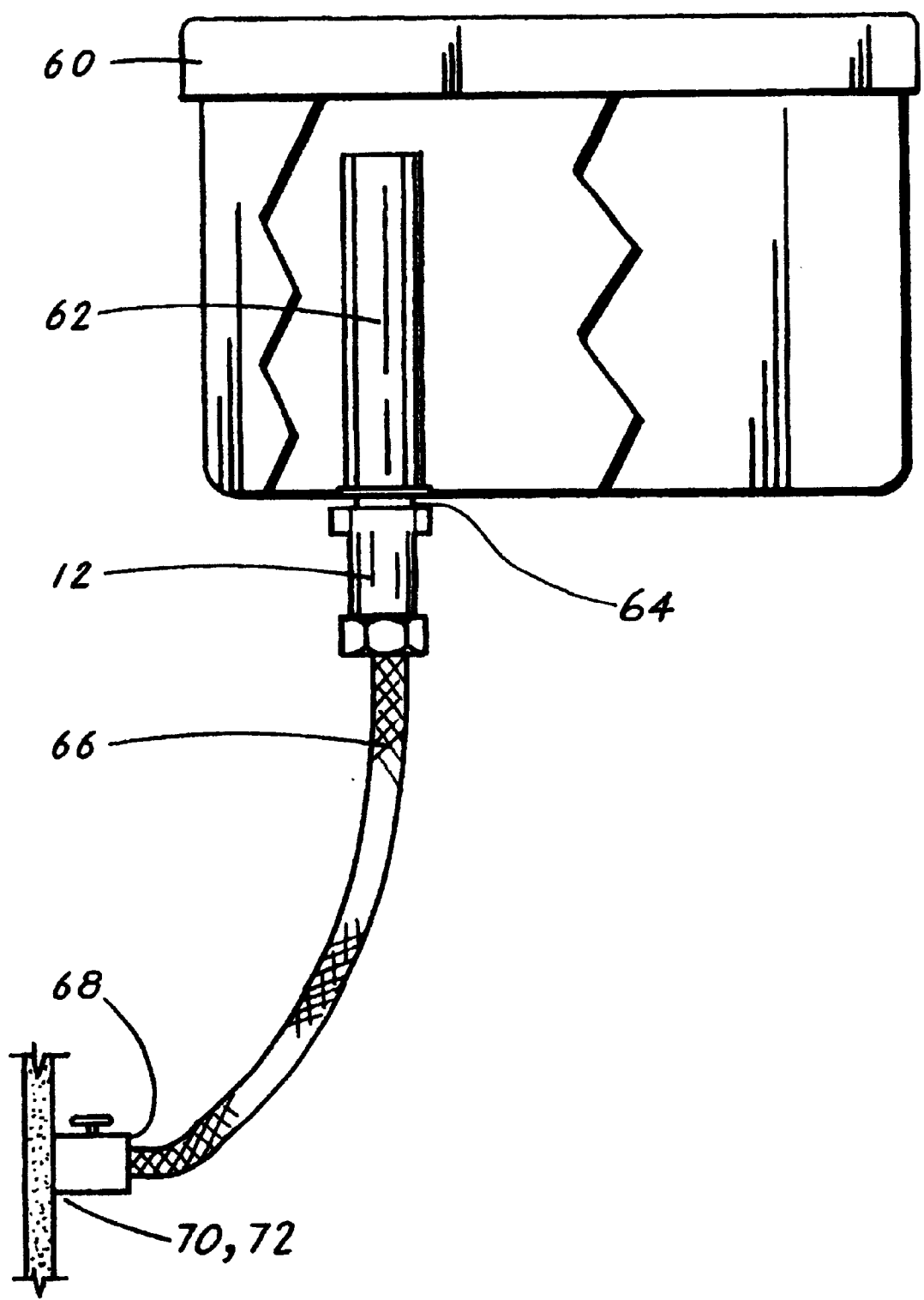
FIG. 2 is an elevational view showing the filter attached to a toilet/fill valve and to a flexible water line which is attached to a water source.

The toilet water-line filter 10, hereinafter "filter 10", functions in combination with a toilet 60, fill valve 62, which has a threaded inlet 64 that protrudes through a bore on the base of a toilet tank, as shown in FIG. 2. The filter 10 also functions with a water line 66 that preferably consists of a flexible water line 66 having an inlet 68 connected to a water source 70 and a threaded outlet 72, as also shown in FIG. 2.

Figure 1:
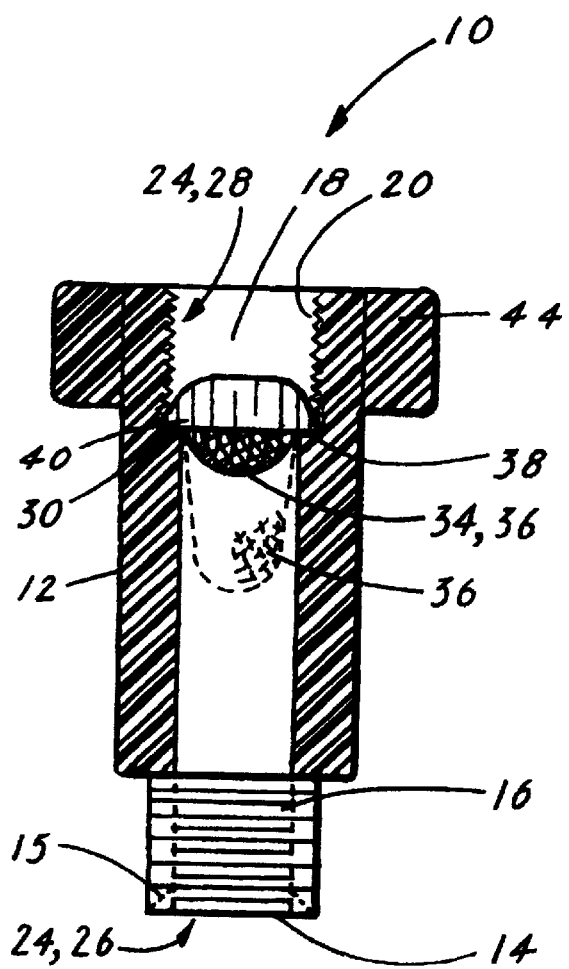
FIG. 1 is a cross-sectional, elevational view of the toilet water-line filter.
Figure 3:
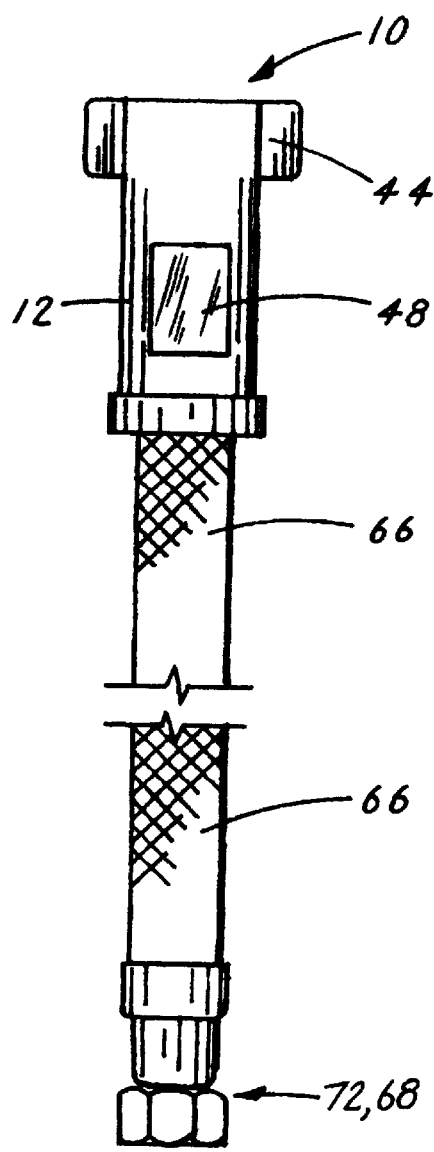
FIG. 3 is an elevational view of the filter integrally attached to a flexible water line.

The filter 10 itself as shown in FIGS. 1–3, is comprised of two major elements: a housing 12 and a filter 34. The housing 12, which preferably has a length of 2.75 inches (6.99 cm) and an external diameter of 1.25 inches (3.18 cm), is constructed of either a metal such as copper, brass or aluminum or plastic.

When the filter 10 is constructed of plastic, the housing 12 can be colored or transparent, which allows the filter 34 to be seen while inside the housing 12. As shown in FIG. 1, the housing 12 is comprised of an inlet 14 having a set of external threads 16, an outlet 18 having a set of internal threads 20, and a bore 24, which is comprised of a first 26 and second 28 diameter. As also shown in FIG. 1, the first diameter 26 extends from the edge of the inlet 14 to an outward-projecting ledge 30. The second diameter 28 commences form the ledge 30 and extends to the edge of the outlet 18. The inlet 14 of the housing 12 has an internal beveled edge 15, as shown in FIG. 1, which allows the inlet to securely interface with the outlet 72 of the water line 66.

Figure 4:
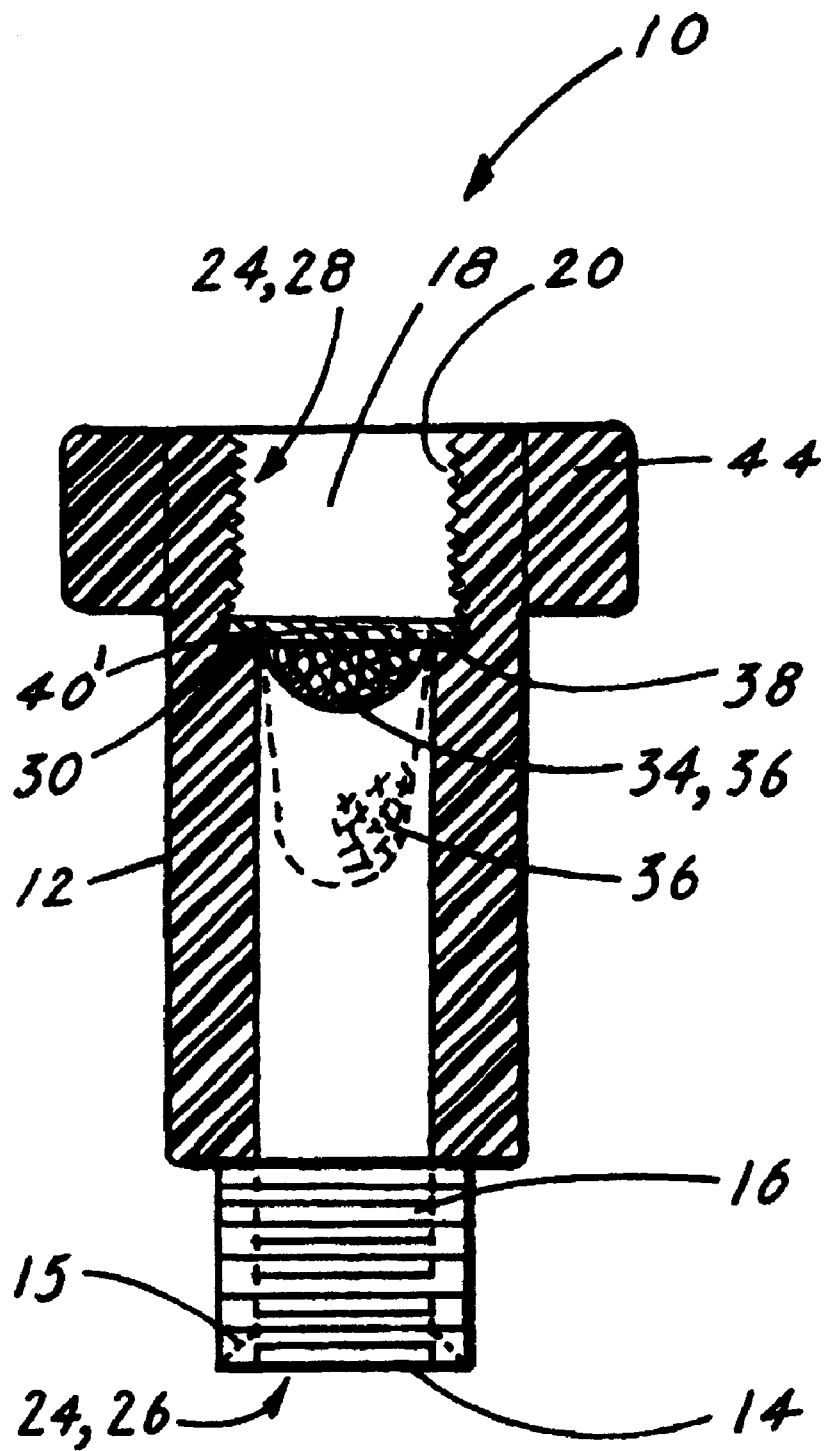
FIG. 4 is a cross-sectional, elevational view of the toilet water-line filter with the filter attached to a resilient washer having a water outlet side that is flat.

The filter 34, as shown in FIG. 1, is comprised of a mesh straining element 36 having an edge 38 that is attached to a resilient washer 40. The resilient washer 40 preferably has a water outlet side having a truncated, conic shape as shown in FIG. 1. Alternatively, the washer can have a water outlet side that is flat shown in FIG. 4, designated 40. The mesh straining element 36 can consist of a short convex section as shown by the solid lines in FIG. 1 or the section 36 can consist of an elongated section 36 as shown by the broken lines in FIG. 1. In either design, the element 36 can be constructed of a metal, such as copper, brass or aluminum, or plastic. The filter 34 is dimensioned to allow the washer 40 to seat against the ledge 30, as shown in FIG. 1.

In order to attach the filter 10, the outlet 18 of the housing 12 is screwed into the threaded inlet 64 of the toilet fill valve 62. The threaded outlet of the flexible, water line 66 is screwed into the threaded inlet 14 of the housing 12 as shown in FIG. 3.

As shown in FIGS. 1–3, the housing 12 also has at least two integrally-attached wings 44. The wings 44 are perpendicular to and extend outward from the outer surface of the housing 12. By use of the wings 44, the filter 10 may be attached and removed from the toilet fill valve 62 without tools.

In order to provide a person using the filter 10 with the ability to check how full the filter 34 is, without having to remove the filter 34 from the toilet 60 or the flexible water line 66, a transparent section 48 is utilized. The transparent section 48, as shown in FIG. 3, is made of glass or plastic, and can be removable from the housing 12 or integrally attached to the housing 12.

Additionally, to add further utility and convenience, the filter 10 can be manufactured integrally attached to the flexible water line 66, as shown in FIG. 3. When the filter 10 is integrally attached to the water line 66, the water line 66 includes an inlet for attachment to the water source 70. The filter 10 can also be manufactured as an integral component of the toilet fill valve 62 (not shown).

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

What is claimed is:

1. A toilet water-line filter which functions in combination with a toilet fill valve having a threaded inlet that protrudes through a bore in the base of a toilet tank, and a water line having an inlet connected to a water source and a threaded outlet, said toilet water-line comprising:

a) a housing having a housing inlet, a housing outlet and housing bore therethrough which is comprised of two diameters, wherein a first diameter extends from an edge of the housing inlet to an outward-projecting ledge from where a second diameter commences and extends to an edge of the housing outlet, wherein the housing inlet having a set of external threads and the housing outlet having a set of internal threads, wherein the inlet of said housing has an internal beveled edge which allows the inlet to securely interface with a water line outlet, and b) a filter comprised of a mesh straining element having an edge that is attached to a resilient washer, wherein the filter mesh straining element is dimensioned to allow the washer to seat against the ledge, wherein the outlet of said housing is screwed into a threaded inlet of a toilet fill valve and the threaded outlet of water line is screwed into the threaded inlet of said housing.

2. The toilet water-line filter as described in claim 1 wherein said housing further comprises a transparent section which allows the straining element to be viewed without having to remove the filter from the toilet or the flexible water line.

3. The toilet water-line filter as described in claim 2 wherein said transparent section is made of glass.

4. The toilet water-line filter as described in claim 2 wherein said transparent section is made of plastic.

5. The toilet water-line filter as described in claim 2 wherein said transparent section is integrally attached to the housing.

6. The toilet water-line filter as described in claim 2 wherein said transparent section is removable from the housing.

7. The toilet water-line filter as described in claim 1 wherein said water-line filter is attached to a flexible water line.

8. The toilet water-line filter as described in claim 1 wherein said housing is made of a metal.

9. The toilet water-line filter as described in claim 1 wherein said housing is made of plastic.

10. The toilet water-line filter as described in claim 1 wherein said outlet's internal threads are dimensioned to be attachable to a standard water line.

11. The toilet water-line filter as described in claim 1 wherein said inlet's internal threads are dimensioned to be attachable to a standard toilet fill valve.

12. The toilet water-line filter as described in claim 1 wherein said housing has a length of 2.75 inches (6.99 cm) and an external diameter of 1.25 inches (3.18 cm).

13. The toilet water-line filter as described in claim 1 wherein said mesh straining element is made of a metal.

14. The toilet water-line filter as described in claim 1 wherein said mesh straining element is made of a plastic.

15. The toilet water-line filter as described in claim 1 wherein said resilient washer has a water outlet side having a truncated, conic shape.

16. The toilet water-line filter as described in claim 1 wherein said resilient washer has a water outlet side that is flat.

17. The toilet water-line filter as described in claim 3 wherein said housing has at least two integrally-attached wings, perpendicular to and extending outward from a portion of the housing outer surface, which allows the water-line filter to be attached without tools.

18. The toilet water-line filter as described in claim 1 further comprising an integral flexible water line.

19. The toilet water-line filter as described in claim 1 wherein said integral flexible water line includes an inlet for attachment to a water source.

\* \* \* \* \*